W. L. AUSTIN.
FORWARD TRUCK FOR LOCOMOTIVES.
APPLICATION FILED APR. 13, 1909.

940,494.

Patented Nov. 16, 1909.

2 SHEETS—SHEET 1.

Inventor:—
William L. Austin.
by his Attorneys
Howson & Howson

Witnesses:—

W. L. AUSTIN.
FORWARD TRUCK FOR LOCOMOTIVES.
APPLICATION FILED APR. 13, 1909.
940,494.
Patented Nov. 16, 1909.
2 SHEETS—SHEET 2.
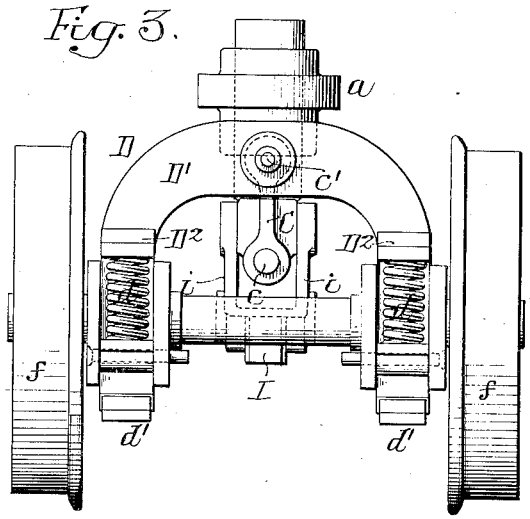
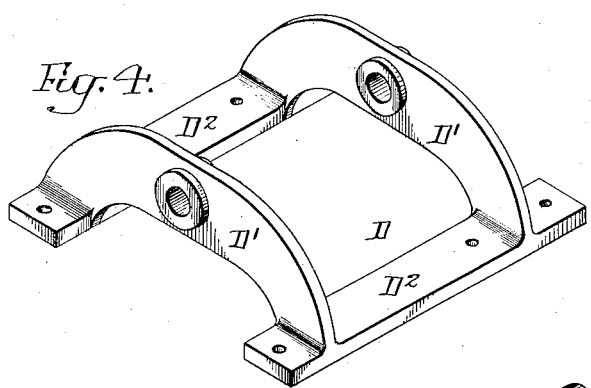
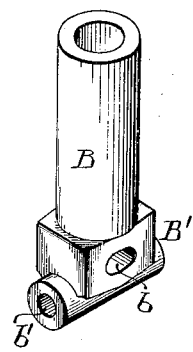
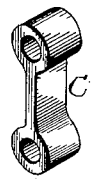
Witnesses:-
Inventor:-
William L. Austin.
by his Attorneys

UNITED STATES PATENT OFFICE.

WILLIAM L. AUSTIN, OF PHILADELPHIA, PENNSYLVANIA, ASSIGNOR TO BURNHAM, WILLIAMS & COMPANY, OF PHILADELPHIA, PENNSYLVANIA, A FIRM.

FORWARD TRUCK FOR LOCOMOTIVES.

940,494.  Specification of Letters Patent.  Patented Nov. 16, 1909.

Application filed April 13, 1909. Serial No. 489,736.

*To all whom it may concern:*

Be it known that I, WILLIAM L. AUSTIN, a citizen of the United States, residing in Philadelphia, Pennsylvania, have invented certain Improvements in Forward Trucks for Locomotives, of which the following is a specification.

My invention relates to certain improvements in the forward swing truck for locomotives, and the object of my invention is to reduce the space occupied by the mechanism of the truck, and yet allow for the proper swinging of the truck to accommodate the curvatures of the track.

Figure 1:
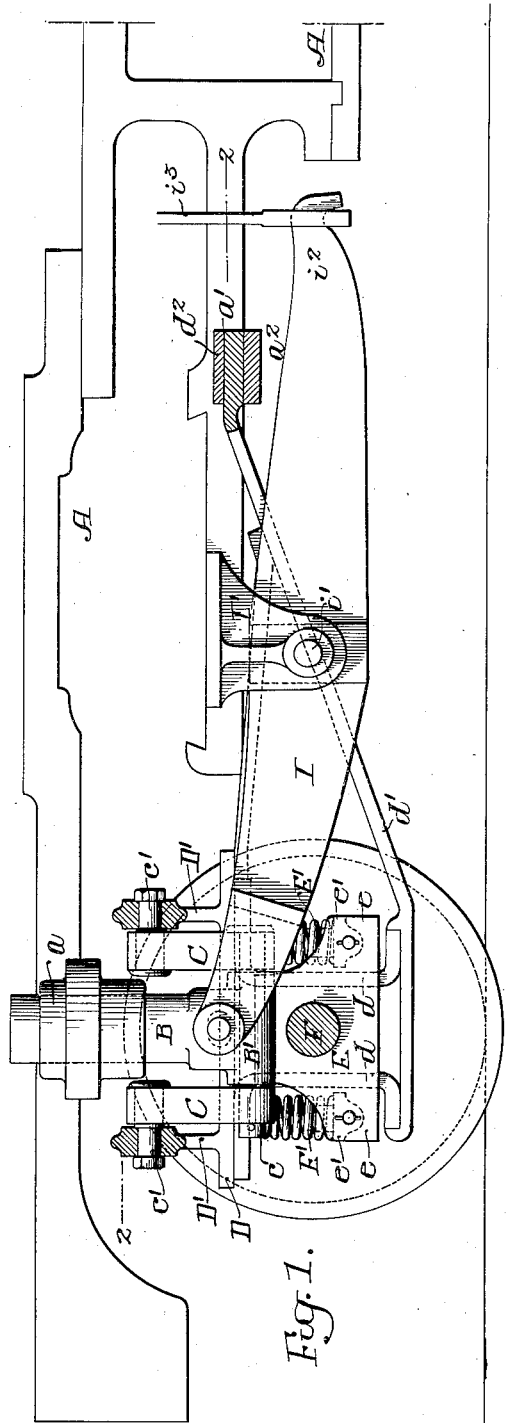
Figure 2:
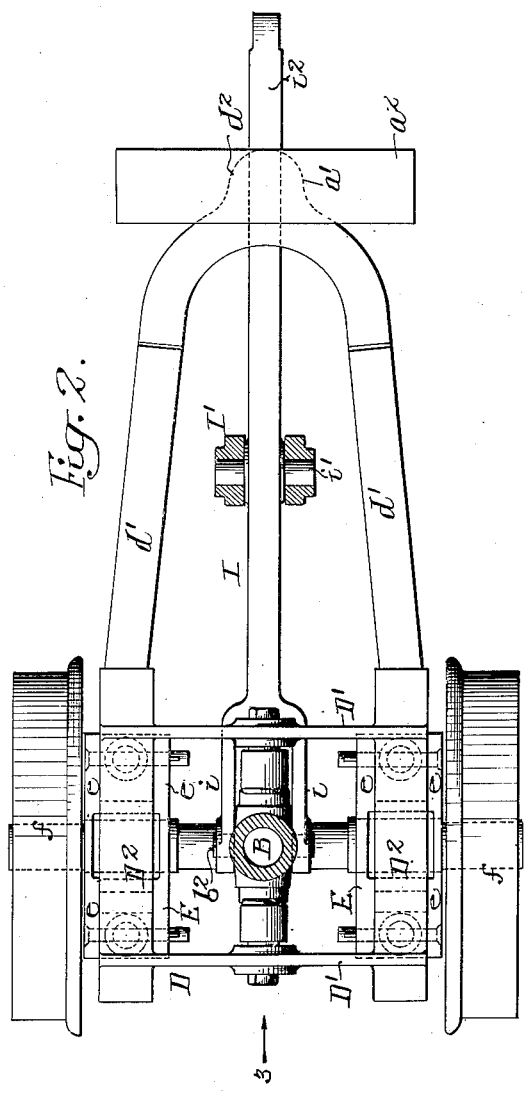

In the accompanying drawings:—Figure 1, is a longitudinal sectional view of a portion of a locomotive, illustrating my invention; Fig. 2, is a sectional plan view on the line 2—2, Fig. 1; Fig. 3, is a view looking in the direction of the arrow 3, Fig. 2; Fig. 4, is a detached perspective view of the frame; Fig. 5, is a detached perspective view of the center pin, and Fig. 6, is a perspective view of one of the links.

A is the frame of the locomotive, having a center bearing $a$ for the vertical pin B. The pin has a head B' at its lower end, as illustrated in Fig. 5, and in this head is a transverse hole $b$ and a longitudinal hole $b'$. Mounted in the longitudinal hole $b'$ is a pin $c$. This pin extends beyond the head B' and coupled to the pin are the links C, Fig. 6, which are hung on studs $c'$ projecting from the arched members D' of the frame D.

The arched members D' of the frame D are connected together by longitudinal members $D^2$ forming the frame as illustrated in Fig. 4. Depending from this frame are the pedestals $d$—$d$ for the boxes E, in which the axle F is mounted, the axle having wheels $f$—$f$. Secured to the lower portions of the pedestals $d$—$d$ is a U-shaped guide $d'$, which extends rearwardly and has a rounded projection $d^2$ adapted to a socket $a'$ in a transverse plate $a^2$. This U-shaped guide not only acts as a guide for the truck but also closes the bottom of the recess for the boxes E between the pedestals $d$—$d$.

Each box E has extensions $e$ at each side and pivoted to the extensions are spring carrying plates $e'$, on which are mounted the springs E', said springs resting against the under side of the frame D.

Extending through the transverse opening $b$ in the head B' of the center pin B is a bar $b^2$, to which is coupled one arm of the equalizing lever I, the arm being forked at $i$ to allow it to pass clear of the head B' and link C. The equalizing lever I is pivoted at $i'$ to a hanger I', attached to a cross member of the frame A, and its rear end $i^2$ is attached to the link $i^3$ connected to the main equalizing mechanism of the locomotive. Thus it will be seen that the connection of the equalizing lever is at the center of the truck and the frame of the truck is connected by two links also at the center in place of the links usually located at each side of the truck, dispensing with a heavy and cumbersome frame, the two links taking the place of the four links heretofore used.

By this arrangement I make a very light and substantial truck, allowing a clear space on each side of the center. A truck of this construction is especially adapted for certain classes of locomotives, where flexibility of the forward truck is desired without increasing the weight of the truck.

I claim:—

1. The combination of a center pin, adapted to a bearing in the main frame of the locomotive, said pin having a head at its lower end, said head having a longitudinal and a transverse opening, pins in each opening, two links attached to the longitudinal pin, a truck frame to which the links are connected, boxes in the truck frame, an axle mounted in the boxes, and an equalizing lever connected to the transverse pin carried by the head of the pivot pin.

2. The combination of a pivot pin adapted to a bearing in the frame of a locomotive, said pivot pin having a head, longitudinal and transverse pins carried by the head, links attached to the longitudinal pin, a frame having transverse members to which the links are connected, boxes mounted in the pedestals of the frame, springs mounted between the boxes and the pedestals, and a guide connected to the frame and extending rearwardly and adapted to a socket on the main frame of the locomotive.

3. The combination of a locomotive frame, having a center bearing, a truck having pedestals, boxes mounted in the pedestals, an axle journaled in the boxes, springs mounted between the boxes and the frame, a center pin adapted to the center bearing on the locomotive frame, links connecting the lower portion of the center pin with the truck frame, and an equalizing lever connected to the center pin and to the main equalizing mechanism of the locomotive.

4. The combination of a locomotive frame, having a center bearing, a truck frame having pedestals, boxes mounted in the pedestals, an axle mounted in the boxes, springs mounted between the boxes and the frame, a rearwardly extending U-shaped guide attached to the pedestals of the frame and adapted to a socket in the frame of the locomotive, a pivot pin adapted to the center bearing of the frame of the locomotive, two links connecting the lower portion of the pivot pin with the truck frame, and an equalizing lever pivoted to the locomotive frame, having one arm connected to the pivot pin and the other arm connected to the equalizing gear of the locomotive.

5. The combination of a locomotive frame, having a center bearing, a truck frame having arched members, pedestals depending from the said frame, boxes in the pedestals, axles mounted in the boxes, springs mounted between the boxes and the frame, a center pin adapted to the center bearing on the frame of the locomotive, links connecting the lower portion of the center pin with the arched members of the frame, one in advance and the other at the rear of the center pin, a U-shaped guide secured to the pedestals of the frame and having a central extension adapted to a socket in the frame of the locomotive, and an equalizing lever pivoted to the frame of the locomotive and forked at the forward end and pivoted to the lower portion of the center pin, the other arm of the lever being connected to the equalizing mechanism of the locomotive substantially as described.

In testimony whereof, I have signed my name to this specification, in the presence of two subscribing witnesses.

WM. L. AUSTIN.

Witnesses:
R. H. SANFORD,
J. H. KERST.